United States Patent Office 3,420,268
Patented Jan. 7, 1969

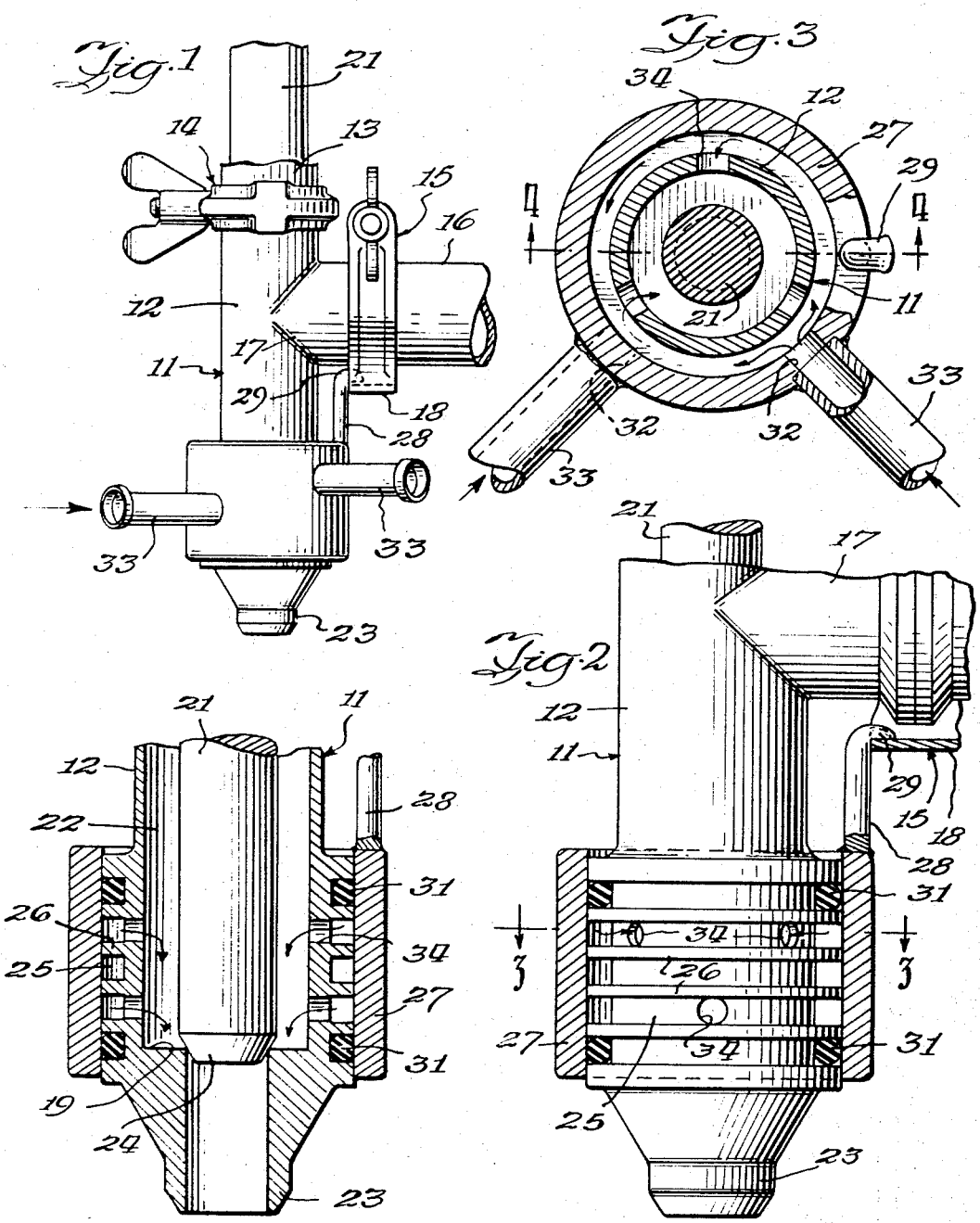

3,420,268
APPARATUS FOR FLOWING PRESSURE-FLOWABLE FOOD PRODUCTS INTO A CONTAINER
Martin Mueller, Chicago, Ill., assignor, by mesne assignments, to Lily-Tulip Cup Corporation, New York, N.Y., a corporation of Delaware
Filed Jan. 10, 1967, Ser. No. 608,374
U.S. Cl. 137—604          7 Claims
Int. Cl. F16k *19/00*

ABSTRACT OF THE DISCLOSURE

An apparatus for flowing a plurality of pressure-flowable food products into a container comprising a tubular member forming a first flow path for one of the food products and a sleeve encircling a portion of the tubular member. A plurality of axially spaced circular grooves between the tubular member and the sleeve form separate second flow paths for the other food products. Each of the second flow paths communicates with the first flow path through apertures defined by the tubular member. A valve mounted in the tubular member between the apertures and the container controls the flow of all the food products through the first flow path.

---

This invention relates to an apparatus for flowing a plurality of pressure-flowable food products into a container, and is particularly concerned with means that may be easily secured to a tubular member, through which a food product is flowed, for directing a plurality of other food products into the flow path of the first mentioned food product and for distributing each of the other food products uniformly around the peripheral surface of the first food product.

Apparatus embodying the present invention may be used in packaging different kinds of products, but, for convenience, will be described with particular reference to the packaging of ice cream and syrup. The ice cream is flowed through a tubular member having a valve therein to regulate the flow. The one or more syrups that are directed into the flow path of the ice cream enters the stream of ice cream upstream of the valve seat, so that when the valve is closed it shuts off the flow of syrups as well as the flow of ice cream.

A sleeve that encircles a portion of the tubular member cooperates therewith to define a plurality of axially spaced grooves. The two outermost grooves provide seats for a pair of sealing members, and the intermediate grooves provide separate flow paths for syrups. Any number of grooves may be provided to accommodate any desired number of syrups of different flavors. The tubular member defines one or more apertures in each groove to enable the flow paths for syrups to communicate with the flow path for ice cream. The apertures in any groove having more than one aperture are preferably spaced uniformly circumferentially of the tubular member, in order to provide more uniform distribution of the syrup, but may be spaced in any desired relationship.

The sleeve is retained in proper position relative to the tubular member in a very simple manner. A pin that is fixed at one end to the sleeve has its other end bent into hook shape. The hooked end of the pin fits within a split clamp that is tightened around the joint between an inlet fitting for the ice cream and one end of a conduit or supply pipe leading from a source of ice cream. When the clamp is tightened, the sleeve cannot move relative to the tubular member. The sleeve may be readily removed when the clamp is loosened.

Suitable structure by means of which the above mentioned and other advantages of the invention are attained will be fully described in the following specification, taken in conjunction with the accompanying drawings showing a preferred illustrative embodiment of the invention, in which:

FIGURE 1 is an elevational view of an apparatus embodying the invention;

FIGURE 2 is a fragmentary enlarged elevational view of the structure of FIGURE 1, with a portion of the sleeve cut away to show the interior structure;

FIGURE 3 is a cross-sectional view, taken in the plane indicated by the line 3—3 of FIGURE 2; and FIGURE 4 is a fragmentary cross-sectional view, taken in the plane indicated by the line 4—4 of FIGURE 3.

In the drawings, a tubular member 11 defines a flow path for a first pressure-flowable food product such as ice cream, for example. The tubular member may be integral, but preferably comprises two tubular sections 12 and 13 held together by a resilient clamp 14. A second clamp 15 secures a supply conduit 16 to an inlet fitting 17 communicating with the tubular member. The clamp 15 has a section 18 bulged outwardly for a purpose hereinafter disclosed.

The tubular section 12 has an internal annular shoulder 19 defining a seat for a valve body 21 having an outer diameter less than the inner diameter of the tubular member 11 above the shoulder 19. When the valve body 21 is spaced from its seat, the ice cream flows downwardly through the annular space 22 between the outer surface of the valve body 21 and the inner surface of the tubular section 12, and then through the discharge outlet 23 that is aligned with the container that is to be filled. The lower end of the valve body 21 is preferably tapered, as indicated at 24, to facilitate seating against the shoulder 19 to cut off the flow of ice cream.

The valve body 21 is reciprocated within the tubular member 11, by any suitable means, to allow the ice cream to flow into a container positioned below the discharge outlet 23 and to shut off the flow of ice cream when the container is moved out of alignment with the discharge outlet. An example of apparatus capable of reciprocating the valve body in the desired manner is disclosed in my prior Patent 3,267,971, dated Aug. 23, 1966.

The lower portion of the tubular section 12 is of increased thickness, and is provided with a plurality of axially spaced grooves 25 separated by circumferential ribs 26 and having their open outer side covered by a sleeve 27. The sleeve 27 is held in place by a pin 28 extending upwardly therefrom and having a hooked end 29 engaging the bulged section 18 of the clamp 15. The hooked end of the pin is moved into engagement with the section 18 of the clamp when the clamp is loose, and when the clamp is tightened to hold one end of the supply conduit 16 tightly against the outer end of the inlet fitting 17, it also holds the hooked end of the pin 28 tightly so that the sleeve 27 cannot move relative to the tubular member.

The sleeve 27 engages the outer surfaces of the ribs 26 and forms a closure for each of the grooves 25. An O-ring 31 is positioned in each of the two outermost grooves to form a seal between the sleeve and the tubular member 11 on both sides of the intermediate grooves 25 each of which forms a part of a separate flow path for a different pressure-flowable food product, such as different syrups, for example, that are to be flowed into the container along with the ice cream.

The sleeve 27 defines an inlet opening 32 in flow communication with each of the intermediate grooves 25 that is to comprise part of a flow path for a syrup. An inlet fitting 33 mounted on the sleeve 27 in alignment with each opening 32 has its outer end adapted to be connected to a supply conduit for syrups of different flavors. The relative circumferential spacing of the inlet fittings is of no importance, but they are preferably spaced to permit them to be connected to independent syrup sources. Although only two inlet openings are shown in the embodiment of the invention illustrated in the drawings, it will be understood that additional grooves 25, with an inlet opening 32 and fitting 33 for each groove may be provided for different flavors of syrup.

The inner wall of each groove 25 communicating with an inlet opening 32 defines a plurality of apertures 34 in flow communication with the flow path for the ice cream. The number of apertures 34 in each groove may be varied, but they are preferably spaced uniformly around the circumference of the tubular member to insure an even distribution of the syrup within the stream of ice cream flowing through the discharge opening 23. The apertures in each groove 25 are rotationally displaced, relative to the apertures in the other grooves, so that all of the relatively thin streams of syrup flowing into the stream of ice cream are spaced uniformly circumferentially of the stream of ice cream.

Instead of forming the grooves 25 in the peripheral surface of the tubular member 11, it is possible to provide a smooth apertured outer surface on the tubular member and form the grooves either by cutting them in the inner surface of the sleeve 27 or by providing the inner surface of the sleeve with circular ribs that define grooves between them.

Although a preferred embodiment of the invention has been described in considerable detail, it will be understood that the description thereof is intended to be illustrative, rather than restrictive, as many details of construction may be modified or changed without departing from the spirit or scope of the invention. Accordingly, it is not desired to be restricted to the exact details of structure described.

What is claimed is:

1. An apparatus for flowing a plurality of pressure-flowable food products into a container, said apparatus comprising a tubular member defining a first flow path for a first food product, a sleeve fitting over a portion of said tubular member, said tubular member and said sleeve defining a plurality of grooves therebetween, at least one of said grooves providing a separate flow path for a second food product, said sleeve defining a separate inlet opening extending through said sleeve in communication with said one groove for the flow of said second food product into said one groove, and said tubular member defining at least one aperture between said one groove and said first flow path for the flow of said second food product into said first flow path.

2. An apparatus as recited in claim 1, in which said grooves are annular and the tubular member defines a plurality of apertures uniformly spaced circumferentially of said one groove whereby said second food product is introduced into said first flow path at uniformly spaced points.

3. An apparatus as recited in claim 1 and having valve means positioned in said first flow path downstream of where the second food product enters said first flow path to control the flow of said food products.

4. An apparatus as recited in claim 1 including sealing means between said tubular member and said sleeve and spaced axially outwardly of said grooves.

5. An apparatus as recited in claim 4 in which said tubular member has an inlet fitting extending outwardly therefrom, and said sleeve has a pin extending therefrom, a conduit leading from a supply source of said first food product and a clamp interconnecting said conduit and said inlet fitting, said clamp engaging said pin to hold said sleeve against movement relative to said tubular member.

6. An apparatus as recited in claim 4, in which a sealing ring is seated in each of the two outermost grooves to provide efficient seals between said tubular member and said sleeve axially outwardly of said separate flow path.

7. An apparatus as recited in claim 1, in which said grooves are annular and are separated from each other by circumferentially extending ribs defined by said tubular member, said sleeve having a smooth inner surface fitting against the outer surfaces of said ribs to form an outer closure for each of said grooves.

References Cited

UNITED STATES PATENTS

| 1,176,212 | 3/1916 | Fulton | 137—604 XR |
| 1,791,312 | 2/1931 | Hegyes et al. | 137—625.4 |
| 2,537,119 | 1/1951 | Bauerlein et al. | 137—604 |
| 2,733,730 | 2/1956 | Turak | 137—604 XR |
| 3,165,118 | 1/1965 | Moen | 137—604 XR |
| 3,224,740 | 12/1965 | Kuehn et al. | 137—606 XR |

JOHN PETRAKES, *Primary Examiner.*

U.S. Cl. X.R.

137—625.4